(12) United States Patent
Toth et al.

(10) Patent No.: US 11,361,423 B2
(45) Date of Patent: Jun. 14, 2022

(54) ARTIFICIAL INTELLIGENCE-BASED PROCESS AND SYSTEM FOR VISUAL INSPECTION OF INFRASTRUCTURE

(71) Applicant: RecognAIse Technologies Inc., Vancouver (CA)

(72) Inventors: Janos Csaba Toth, Vancouver (CA); David Stefan Hauser, Vancouver (CA); Attila Daniel Toth, Vancouver (CA); Melinda Meszaros, Vancouver (CA)

(73) Assignee: RecognAIse Technologies Inc., Vancouver (CA)

( * ) Notice: Subject to any disclaimer, the term of this patent is extended or adjusted under 35 U.S.C. 154(b) by 51 days.

(21) Appl. No.: 16/904,111

(22) Filed: Jun. 17, 2020

(65) Prior Publication Data

US 2020/0394784 A1  Dec. 17, 2020

Related U.S. Application Data

(60) Provisional application No. 62/862,367, filed on Jun. 17, 2019.

(51) Int. Cl.
*G06T 7/00* (2017.01)
(52) U.S. Cl.
CPC .. *G06T 7/0004* (2013.01); *G06T 2207/20081* (2013.01); *G06T 2207/20084* (2013.01); *G06T 2207/30184* (2013.01)
(58) Field of Classification Search
CPC ......... G06T 7/0004; G06T 2207/20081; G06T 2207/20084; G06T 2207/30184; G06T 2207/30108
See application file for complete search history.

(56) References Cited

U.S. PATENT DOCUMENTS

| 6,324,532 B1 | 11/2001 | Spence et al. |
| 6,819,790 B2 | 11/2004 | Suzuki et al. |
| 2003/0023404 A1* | 1/2003 | Moselhi ................ G06T 7/0004 702/181 |

(Continued)

FOREIGN PATENT DOCUMENTS

| EP | 3483797 A1 | 5/2019 |
| JP | 2016502216 A | 1/2016 |

(Continued)

OTHER PUBLICATIONS

Nguyen-Meidine et al., "A Comparison of CNN-based Face and Head Detectors for Real-Time Video Surveillance Applications", IEEE, Apr. 2017, vol. 978-1-5386-1842.

(Continued)

*Primary Examiner* — Ping Y Hsieh
(74) *Attorney, Agent, or Firm* — McCarthy Tétrault LLP

(57) ABSTRACT

An artificial intelligence (AI) based system for detecting defects in infrastructure uses an image recognizer and image data. A set of annotated training and validation data is generated to train and validate the image recognizer. The image data is annotated with classification data such as defect type and severity of the defect. Once trained and validated, the image recognizer can analyze inspection images to identify detects therein and generate an output report including the identification and classification of the defect, and remediation recommendations.

13 Claims, 12 Drawing Sheets

(56) References Cited

U.S. PATENT DOCUMENTS

| | | | |
|---|---|---|---|
| 2016/0358041 | A1 | 12/2016 | Venkataraman et al. |
| 2018/0232601 | A1* | 8/2018 | Feng .................... G06K 9/4628 |
| 2019/0012579 | A1 | 1/2019 | Namiki |
| 2019/0156474 | A1 | 5/2019 | Watanabe |
| 2020/0364849 | A1* | 11/2020 | Zhang ....................... G06T 7/62 |
| 2020/0380658 | A1* | 12/2020 | Yang ......................... G06N 3/08 |

FOREIGN PATENT DOCUMENTS

| | | |
|---|---|---|
| WO | 2007/0140473 A2 | 1/2007 |
| WO | 2017091308 A1 | 6/2017 |
| WO | 2018165753 A1 | 9/2018 |

OTHER PUBLICATIONS

Taylor & Francis, "A future of power outages: What happens when the lights go out?", Science Daily, Nov. 3, 2014, www.sciencedaily.com/releases/2014/11/141103114045.htm.

Agnisarman et al., "A survey of automation-enabled human-in-the-loop systems for infrastructure visual inspection", Automation in Construction, Elsevier, Nov. 6, 2018, vol. 97, 52-76; Available online: https://doi.org/10.1016/j.autcon.2018.10.019.

Schmidthaler & Reichl, "Assessing the socio-economic effects of power outages ad hoc", Comput Sci Res Dev , Mar. 7, 2016, vol. 31, 157-161.

Larrauri, Sorrosal & González, "Automatic System for Overhead Power Line Inspection using an Unmanned Aerial Vehicle RELIFO Project", IEEE, 2013 International Conference on Unmanned Aircraft Systems (ICUAS), May 28-31, 2013, Grand Hyatt Atlanta, Atlanta, GA, vol. 978-1-4799-0817.

Yeum et al., "Autonomous image localization for visual inspection of civil infrastructure", Smart Materials and Structures, Feb. 21, 2017, vol. 26, 035051.

Lan et al. "Defect Detection from UAV Images based on Region-Based CNNs", arXiv:1811.09473 [cs.CV], Nov. 23, 2018.

Küfeoğlu, Sinan, "Economic Impacts of Electric Power Outages and Evaluation of Customer Interruption Costs", Aalto University School of Electrical Engineering, Doctoral Dissertations Publication Series. vol. 131/2015, Sep. 1, 2015.

Byrd & Matthewman, "Exergy and the City: The Technology and Sociology of Power (Failure)", Journal of Urban Technology, 2014, vol. 21, No. 3, pp. 85-102.

Allianz, "Energy Risks—the dangers of power cuts and blackouts" Allianz Expert Risk Articles, Feb. 2, 2019, https://www.agcs.allianz.com/insights/expert-risk-articles/energy-risks/.

Southwest Research Institute and Electric Power Research Institute: "Future Inspection of Overhead Transmission Lines", EPRI, Palo Alto, CA: 2008. 1016921.

"The Effects of a Power Outage on a Business", Mission Foster Critical, Feb. 8, 2018, https://www.fosterfuelsmissioncritical.com/power-outage-effects-businesses/.

Shaalan, A.M., "Impact of Power Outages on Residential Consumers in Riyadh City", JKAU: Eng. Sci., 1995, vol. 7, pp. 111-127.

Adibi & Martins, "Impact of Power System Blackouts," 2015 IEEE Power & Energy Society General Meeting, Denver, CO, 2015.

Amadi, H. "Impact of Power Outages on Developing Countries: Evidence from Rural Households in Niger Delta, Nigeria." Journal of Energy Technologies and Policy, vol. 5, No. 3, 2015: pp. 27-38.

Kezunovic, M. et al. "Impact of Extreme Weather on Power System Blackouts and Forced Outages: New Challenges." (2018). https://pdfs.semanticscholar.org/a291/c7172d2f3b776cdec81849663b8268b778a5.pdf.

"Cost of Hourly Downtime Soars: 81% of Enterprises Say it Exceeds $300K on Average" ITIC Aug. 2, 2016 https://itic-corp.com/blog/2016/08/cost-of-hourly-downtime-soars-81-of-enterprises-say-it-exceeds-300k-on-average/.

Anderson & Bell, "Lights out: Impact of the Aug. 2003 power outage on mortality in New York, NY", Epidemiology. Mar. 2012, vol. 23(2), pp. 189-193.

Chae & Abraham, "Neuro-Fuzzy Approaches for Sanitary Sewer Pipeline Condition Assessment", Journal of Computing in Civil Engineering, Jan. 2001, vol. 15 (1), pp. 4-14.

Radovic et al., "Object Recognition in Aerial Images Using Convolutional Neural Networks", Journal of Imaging 2017, 3, 21; doi:10.3390/jimaging3020021.

Wirfs-Brocks, J "Power Outages on the Rise Across the U.S." Inside Energy, Aug. 18, 2014, http://insideenergy.org/2014/08/18/power-outages-on-the-rise-across-the-u-s/.

Klinger C. et al. "Power Outages, Extreme Events and Health: a Systematic Review of the Literature from 2011-2012",. PLoS Currents Disasters, Jan. 2, 2014; Edition 1: doi: 10.1371/currents.dis.04eb1dc5e73dd1377e05a10e9edde673.

"Power Outages", Seattle Office of Emergency Management: Seattle Hazard Identification and Vulnerability Analysis, https://www.seattle.gov/emergency-management/hazards/power-outages, 1995-2020 City of Seattle.

"The Cost of Downtime at the World's Biggest Online Retailer" Upguard, Jul. 9, 2018, https://www.upguard.com/blog/the-cost-of-downtime-at-the-worlds-biggest-online-retailer.

Ali, A., "The Impact of Electricity Outages on Households", University of Toronto Graduate Department of Economics, 2016 , http://hdl.handle.net/1807/76179.

"Top 10 Industries that would be Affected Most by a Power Outage", Diesel Service & Supply, https://www.dieselserviceandsupply.com/Industry_Power_Outages.aspx, Feb. 20, 2019.

"Aerial Inspection a Safe, Reliable & Efficient Way to Maintain Transmission Lines" OFIL Systems, Feb. 2012, https://ofilsystems.com/articles/aerial-inspection-a-safe-reliable-efficient-way-to-maintain-transmission-lines/.

Peter & Dimnik, "Transmission Line Assessment & Field Inspections of Line Components", Kinectrics, http://www.kinectrics.com/Solutions/Pages/Transmission-Line-Assessment.aspx, Feb. 22, 2019.

"Weather-Related Blackouts Doubled Since 2003: Report", Research Report by Climate Central, Apr. 10, 2014, https://www.climatecentral.org/news/weather-related-blackouts-doubled-since-2003-report-17281.

Redmon & Farhadi, "YOLOv3: An Incremental Improvement", Apr. 8, 2018, arXiv:1804.02767, vol. 1 [cs.CV].

Girshick et al., "Rich feature hierarchies for accurate object detection and semantic segmentation", IEEE Conference on Computer Vision and Pattern Recognition 2014, vol. 1063-6919/14, available online: https://DOI 10.1109/CVPR.2014.81.

Agnisarman, S.O., "Context-Enabled Visualization Strategies for Automation Enabled Human-in-the-Loop Inspection Systems to Enhance the Situation Awareness of Windstorm Risk Engineers", Graduate School of Clemson University, Published by ProQuest LLC, Dec. 2019.

Watanabe, Hiroshi, "Infrastructure inspection using Toshiba, Alpine, and industrial drones", MONOist, Sep. 5, 2016, available online: https://monoist.atmarkit.co.jp/mn/articles/1609/05/news076.html.

Feng et al., "Deep Active Learning for Civil Infrastructure Defect Detection and Classification", International Workshop on Computing in Civil Engineering (IWCCE), Mitsubishi Electric Research Laboratories, Jun. 2017.

Kasthurirangan Gopalakrishnan et al., "Crack Damage Detection in Unmanned Aerial Vehicle Images of Civil Infrastructure Using Pre-Trained Deep Learning Model", International Journal for Traffic and Transport Engineering, 2018, 8(1): 1-14, DOI: http//dx.doi.org/10.7708/ijtte.2018.8(1).01.

Kasthurirangan Gopalakrishnan et al., "Deep Convolutional Neural Networks with transfer learning for computer vision-based data-driven pavement distress detection", Construction and Building Materials 157 (2017) 322-330, https://doi.org/10.1016/j.conbuildmat.2017.09.110.

Kasthurirangan Gopalakrishnan, "Deep Learning in Data-Driven Pavement Image Analysis and Automated Distress Detection: A Review", Data 2018, 3, 28, doi: 10.3390/data3030028.

Xiao Liang, "Image-based post-disaster inspection of reinforced concrete bridge systems using deep learning with Bayesian optimization", Comput Aided Civ Inf. 2018; 1-16.

* cited by examiner

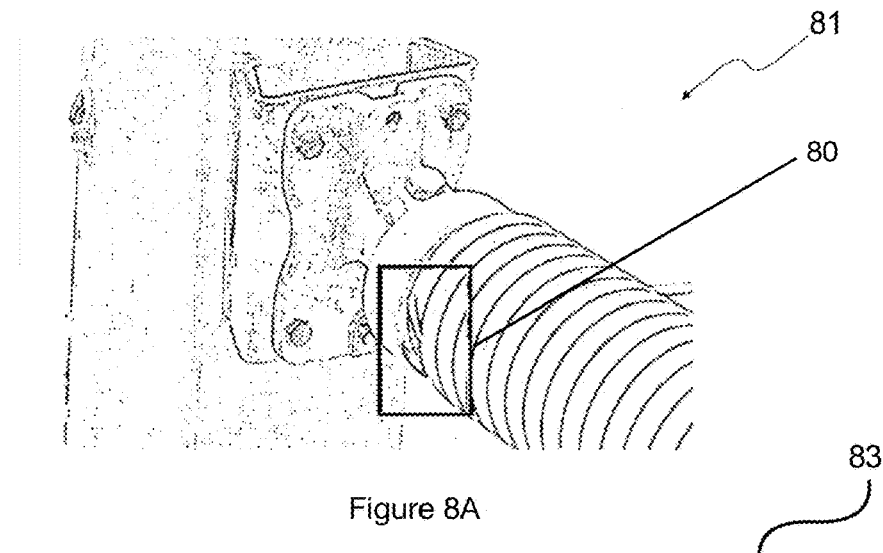

Figure 8A

Line designation: 2L4500

Live Voltage level: 230 kV

Location of Image: Latitude 30.8900215, Longitude -135.5065325

Structure: 435

Defect found!

Description of the deficiency:

Porcelain cross arm insulator for high voltage transmission line is damaged. Piece of the insulator is missing.

Remaining insulator parts are intact.

The conductor is still held up by the insulator.

Comment: Usually small damage to the porcelain insulator is accepted for a short time.

Action recommended:

Deficiency needs to be flagged to the line asset management group at the electrical transmission line company.

Entire insulator piece needs to be replaced with an identical model.

Possible live (energized) work, no outage required.

Risk: Medium

Criticality of remedial action: Medium (action required in near future)

Background information:

Porcelain insulators can get damaged and their condition can impact the safe operation of the line.

Surface fracture can also indicate further micro cracking in the insulator cross arm.

Figure 8B

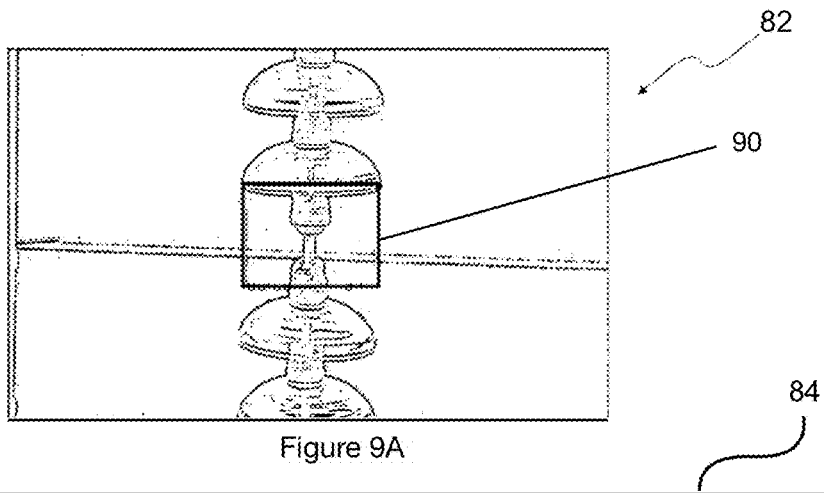

Figure 9A

Line designation: 2L1500

Live Voltage level: 230 kV

Location of Image: Latitude 35.8900215, Longitude -125.5065325

Structure: 236

Defect found!

Description of the defect:

Glass insulator for high voltage transmission line is damaged. One insulator shell broke off.

Remaining glass shells are intact.

The conductor is still held up by the insulator string.

Check with electrical utility how many extra shells are specified as requirement of regular operation.

Comment: Usually two extra shells are specified and if one is broken electrical insulation creep distance is still acceptable for safe operation Action recommended:

Deficiency needs to be flagged to the line asset management group at the electrical transmission line company.

One glass shell needs to be replaced with an identical model.

Possible live (energized) work, no outage required.

Risk: Medium

Criticality of remedial action: Medium (action required in near future)

Background information:

Heat treated toughened glass electrical insulator. These insulators are either intact or destroyed. Their condition by visual inspection could be easily and with high confidence could be evaluated.

Figure 9B

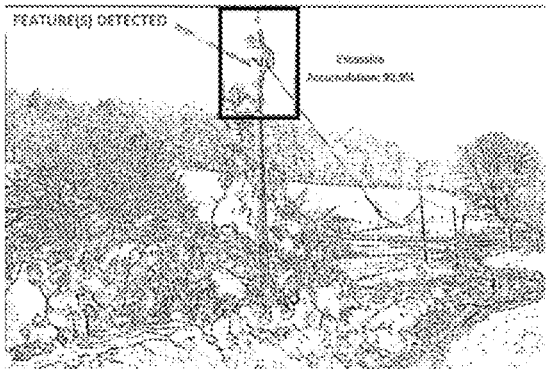

Inspection Report:

Distribution Pole Tag #: ....

Risk – Medium

Advise:

Excessive accumulation of snow/ice is usually caused by lower than usual temperatures, accompanied by higher than usual precipitation. Excessive accumulation can also be caused by running the line too cool – too little power flowing through it.

If the weather forecast does not indicate rising temperatures and instead forecasts increased precipitation, run the line hotter to melt the excess away. If too much snow/ice accumulates, the structural integrity of the structure might be compromised, leading to problems down the line.

Location:

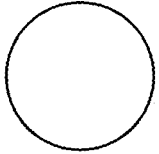

Figure 12

ARTIFICIAL INTELLIGENCE-BASED PROCESS AND SYSTEM FOR VISUAL INSPECTION OF INFRASTRUCTURE

TECHNICAL FIELD

The present invention relates to the field of infrastructure inspection. More particularly, the invention relates to a visual recognition artificial intelligence-based system and an associated process that replace visual imagery evaluation and defect detection by human inspectors.

RELATED APPLICATIONS

This application claims priority from U.S. Provisional Patent Application No. 62/862,367 filed Jun. 17, 2019 entitled "ARTIFICIAL INTELLIGENCE-BASED PROCESS AND SYSTEM FOR VISUAL INSPECTION OF INFRASTRUCTURE". For the purposes of the United States, this application claims the benefit under 35 USC § 119 of United States Provisional Patent Application No. 62/862,367 filed Jun. 17, 2019 entitled "ARTIFICIAL INTELLIGENCE-BASED PROCESS AND SYSTEM FOR VISUAL INSPECTION OF INFRASTRUCTURE", which is incorporated herein by reference in its entirety.

BACKGROUND

A healthy economy is dependent on well maintained and properly upgraded civil infrastructure, such as transmission lines, pipelines, bridges etc. To maintain this infrastructure, its elements need to be routinely inspected to assess their condition and estimate their long-term viability. Infrastructure inspection entails the evaluation of the physical and functional conditions of infrastructure systems.

Conventional inspection methods rely on visual detection of any changes, such as discolorations, cracks, and corrosion on the surface of the structures over time. Inspections involve trained personnel visiting the site and assessing the structures, hardware and related components, and recording the qualitative aspects of the infrastructure. To ensure that defects are detected before they can cause deficiency or failure in an infrastructure system, inspections need to be carried out at regular intervals.

Traditional inspection processes rely on human inspectors physically visiting sites and conducting the evaluation. This can be time consuming, expensive, and dangerous, and often requires access to hard-to-reach locations and interruption of the infrastructure system's regular operation. As a result, currently available inspection methods limit inspection procedures and practices in terms of time and access, resulting in longer than optimal periods between inspections. This hampers effective decision-making regarding proactive maintenance and upgrades.

Conventional inspection methods are also expensive because they rely on trained professionals' time, often under hazardous working conditions. Further, these inspection methods rely on human judgement and as a result they are inherently error prone. Any judgment made by a human is dependent on prior training and experience, as well as on the current state of attention and information processing capability, resulting in variable performances.

While recent advancement in automation and robotic technology has increased the speed, safety, and efficiency of data collection in the field, no such automation has been done for the data evaluation part of the inspection process. Photographs are still evaluated by human inspectors in order to detect defects and the resulting remediation recommendations are then provided by the human inspectors. While some systems may be able to identify defects, human inspectors are still relied upon to provide the appropriate remediation recommendations. Thus, existing processes are time-consuming, error-prone, and limited by the availability of trained personnel. With the increasing age of the workforce, keeping a sufficient number of inspectors on staff is becoming difficult.

Therefore, there is a need for inspection systems and processes that: (i) can identify defects and provide corresponding remediation recommendations without human involvement; and (ii) are fast, reliable, provide repeatable results, efficient, cost-effective, flexible, and adaptable.

The foregoing examples of the related art and limitations related thereto are intended to be illustrative and not exclusive. Other limitations of the related art will become apparent to those of skill in the art upon a reading of the specification and a study of the drawings.

SUMMARY

According to an aspect of the present disclosure, there is provided a method comprising: receiving image data comprising images of infrastructure defects, annotated with classification data; allocating a first portion of the image data as training image data; allocating a second portion of the image data as validation image data; training an artificial intelligence-based image recognizer using the training image data; and validating the image recognizer using the validation image data.

According to an aspect of the present disclosure, the method further comprises: inputting an inspection image into the image recognizer; analyzing, by the image recognizer, the inspection image; identifying, by the image recognizer, a defect in the inspection image; locating, by the image recognizer, a remediation recommendation associated with the defect; and generating an output report based on the defect and the remediation recommendation.

In some embodiments, the output report includes identification and classification of the defect and one or more of: a potential cause of the defect; severity of the defect; and a recommendation on how to address the defect. The classification data may include defect type (e.g. discoloration, fatigue, environmental) and/or severity (e.g. low risk, medium risk, and high risk).

In particular embodiments, a plurality of images of infrastructure is provided, and the plurality of images is filtered to generate a set of inspection images for input to the image recognizer. Filtering the plurality of images may include one or more of: selecting images of high definition (e.g. minimum 1280p×720p resolution), selecting images that show a close-up image of the feature and/or defect, selecting images in which the feature is clearly visible without obstructions; and selecting images captured with good lighting conditions.

Validating the image recognizer may include calculating a recognition accuracy level of the image recognizer and comparing the recognition accuracy level with a threshold confidence level. In particular embodiments, anywhere between 5% to 70% of the image data is initially allocated as the training image data and the remainder of the image data is initially allocated as the validation image data. If the recognition accuracy level is below a threshold confidence level, the allocation of training image data and validation image data may be adjusted to improve the recognition accuracy level.

Another aspect of the present disclosure relates to a system for automatically inspecting infrastructure. The system includes a database management component configured to collect image data including images of infrastructure defects annotated with classification data, allocate a first portion of the image data as training image data, and allocate a second portion of the image data as validation image data. The system also includes an artificial intelligence-based image recognizer configured to receive the image data from the database management component and apply deep learning techniques to develop processes to identify and classify infrastructure defects.

According to particular embodiments, the image recognizer is configured to receive an inspection image, analyze the image, identify a defect in the inspection image, locate in a database a remediation recommendation associated with the defect, and generate an output report based on the defect and the remediation recommendation. The output report may include identification and classification of the defect and one or more of: a potential cause of the defect; severity of the defect; and a recommendation on how to address the defect. The classification data may include defect type (e.g. discoloration, fatigue, environmental) and/or severity (e.g. low risk, medium risk, and high risk).

Some embodiments of the system include an image filtering component configured to receive a plurality of images of infrastructure, and filter the plurality of images to generate a set of inspection images for input to the image recognizer. The image filtering component may be configured to perform one or more of: selecting images of high definition (e.g. minimum 1280px×720p resolution), selecting images that show a close-up image of the feature and/or defect, selecting images in which the feature is clearly visible without obstructions; and selecting images captured with good lighting conditions. Certain embodiments of the system include a validation component configured to receive the output reports generated by the image recognizer using validation data, and compare them to the output reports generated by the image recognizer using the training data, calculate a recognition accuracy level of the image recognizer, and compare the recognition accuracy level with a threshold confidence level.

The database management component may be configured to initially allocate anywhere between 5% to 70% of the image data as the training image data and allocate the remainder of the image data as the validation image data. The validation component may cause the database management component to adjust the allocation of training image data and validation image data to improve the recognition accuracy level if the recognition accuracy level is determined to be below a threshold confidence level.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 8A and 8B are a sample inspection image and corresponding output report, according to one exemplary scenario.

FIGS. 9A and 9B are a sample inspection image and corresponding output report, according to another exemplary scenario.

FIG. 12 is a screen shot of an inspection report for a particular feature of an infrastructure asset according to one exemplary scenario.

DETAILED DESCRIPTION

Figure 1:
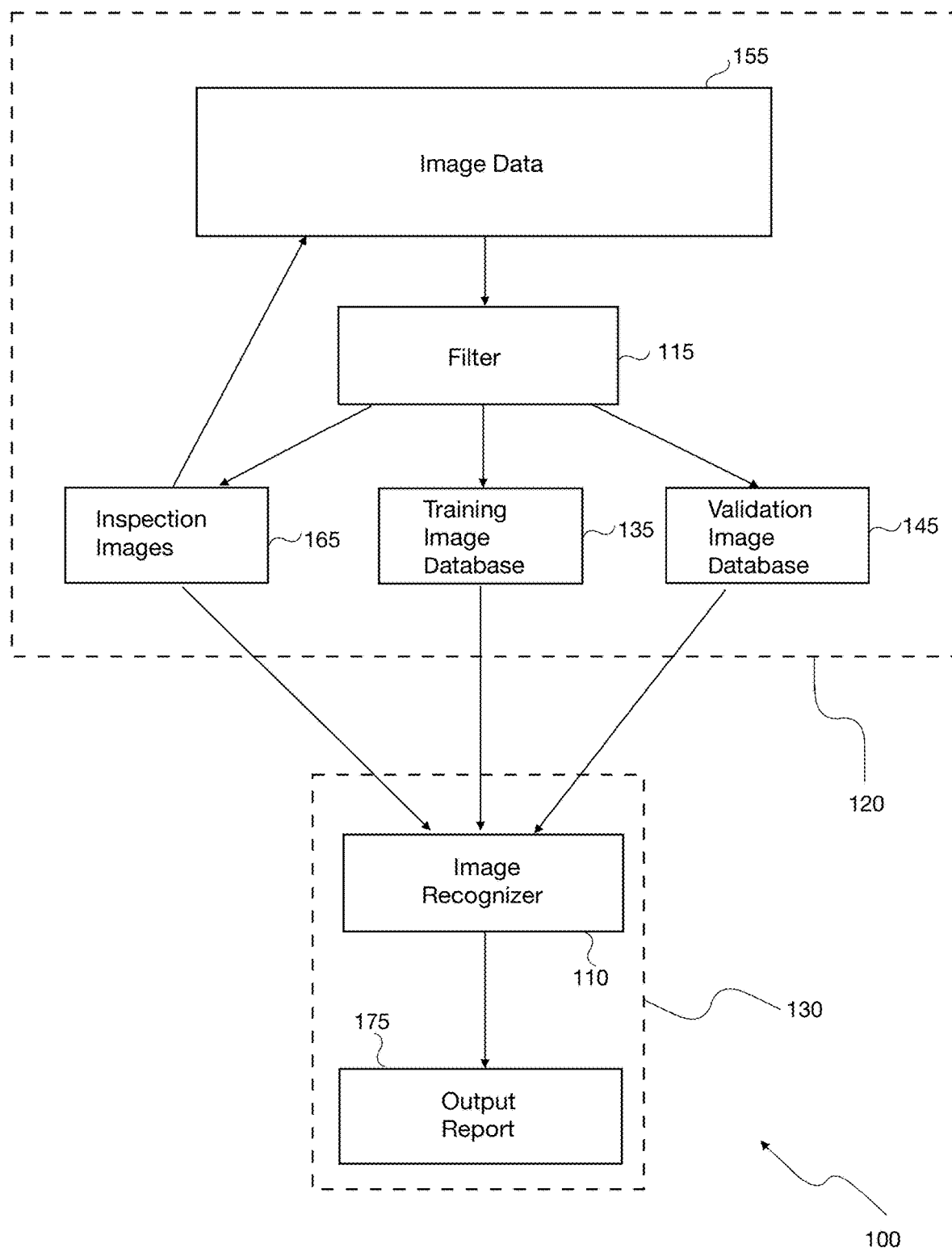
FIG. 1 is a block diagram illustrating an artificial intelligence-based system for automated infrastructure inspection according to one embodiment of the present disclosure.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present disclosure is to be considered as an exemplification of the invention and is not intended to limit the invention to the specific embodiments illustrated by the figures or description below.

The present invention comprises an inspection method and system for inspecting infrastructure, such as transmission lines, electrical distribution lines, electrical substations, pipelines for oil, gas, and/or water, bridges, telecommunication towers, wind turbines, railways, and the like. The inspection system generally comprises an image processing and analyzing artificial intelligence-based component ("AI-based component"). In the training phase, the AI-based component captures the knowledge of industry experts in infrastructure inspection and remediation through machine learning. Once trained, the AI-based component can recognize and categorize elements of infrastructure that are customarily inspected and identify various defects, including for example rust, flashover, loose strand, and the like. Upon the identification of a defect, the system determines the severity of the defect, and automatically outputs a report that comprises a remediation recommendation relating to the defect. The inspection system and method may also include storage of processed inspection data for future references. The present disclosure thus provides a fast, reliable, cost-effective, and adaptable system for inspection of a variety of infrastructure that minimizes human involvement.

The inspection system uses images of infrastructure for training, validation and inspection purposes. "Images", as used herein, include photographic images and video footage. The images may be one or more of: LIDAR, corona, multi-spectral, infrared, optical, UV, magnetic, X-ray, satellite, RADAR, ground penetrating radar, ultrasonic, and the like. The format of the photographic images may be one or more of: TIFF, JPEG, GIF, PNG, raw image files, and the like. The format of the video footage may be one or more of: MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf*), WEBM (webm), FLV (flv), AVI, QuickTime, HDV, MXF (OP1a, OP-Atom), MPEG-TS (ts), MPEG-2 PS, MPEG-2 TS, WAV, Broadcast WAV, LXF, GXF, VOB, and the like.

The present invention will now be described by referencing the appended figures representing preferred embodiments. FIG. 1 is a block diagram depicting an exemplary inspection system 100. In the illustrated embodiment, system 100 comprises a data management component 120, and an image analyzer 130 having an artificial intelligence-based ("AI-based") image recognizer 110. It is to be understood that the configuration and boundaries of the functional building blocks of system 100 have been illustrated and defined herein for the convenience of the description. Alternative boundaries can be defined so long as the specified functions and relationships thereof are appropriately performed. Alternatives will be apparent to those skilled in the relevant art(s) based on the teachings provided herein.

In one embodiment, the data management component 120 manages pre-assessed image data 155 used for training or validation purposes. Pre-assessed image data 155 comprises images and associated data thereof, including metadata and annotations. The images in pre-assessed image data 155 may include, for example, client-provided historical data, proprietary data, and/or publicly available data. The metadata and annotations may be supplied by human inspectors or generated automatically (e.g. time and location where the image was captured), and may include information regarding the identity of one or more infrastructure features depicted in the image, and location data indicating the geographical location of each infrastructure feature. The associated data also includes the classification of the type, severity and/or other characteristics of one or more defects in the feature(s) shown in the image, and/or a remediation recommendation in regards to the defect(s).

Image data 155 may be stored within or outside the system 100, on one or more of databases and/or devices accessible to data management component 120. The image data 155 may be stored on hard drives, servers, cloud-based storage, or a combination thereof. In the illustrated embodiment, the system 100 comprises a training image database 135 and a validation image database 145. In one particular embodiment, about 70% of the image data 155 is allocated as training image data and stored in the training image database 135 and the remaining (about 30%) is allocated as validation image data and stored in the validation image database 145. Other embodiments may have different percentages of training and validation image data (such as, for example, approximately 60% training/40% validation, approximately 75% training/25% validation). In some embodiments, somewhere between 5% to 70% of the image data 155 is allocated as training data with the remainder allocated as validation image data. The allocation of training and validation data may be performed randomly.

The image analyzer 130 is configured to receive one or more inspection images 165. The inspection images comprise images of transmission infrastructure for which an inspection is required. These images may be selected and/or supplied by the client. The image analyzer 130 provides the inspection images 165 to image recognizer 110, which processes the images. In certain embodiments, the image recognizer 110 analyzes the inspection images 165 for already learned features and defects. The inspection images 165 may comprise a streaming video feed and the image recognizer 110 compares the video feed with stored images of the same infrastructure feature. In some embodiments, the image recognizer 110 may compare one or more of the inspection images 165 with image data associated with a particular feature collected at different points in time.

Based at least in part on the inspection images 165 and the analysis completed by the image recognizer 110, image analyzer 130 generates one or more output reports 175 providing a classification of the type, severity and/or other characteristics of one or more defects in the feature(s) shown in the images, and/or a remediation recommendation in regards to the defect(s). After the analysis by the image recognizer 110 is completed, the inspection images 165 and any corresponding reports generated by the image recognizer 110 may be added to the database of pre-assessed image data 155 managed by the data management component 120. This added data may be used for training purposes (i.e. to further train image recognizer 110 to identify and assess defects) and/or for validation purposes.

Figure 2:
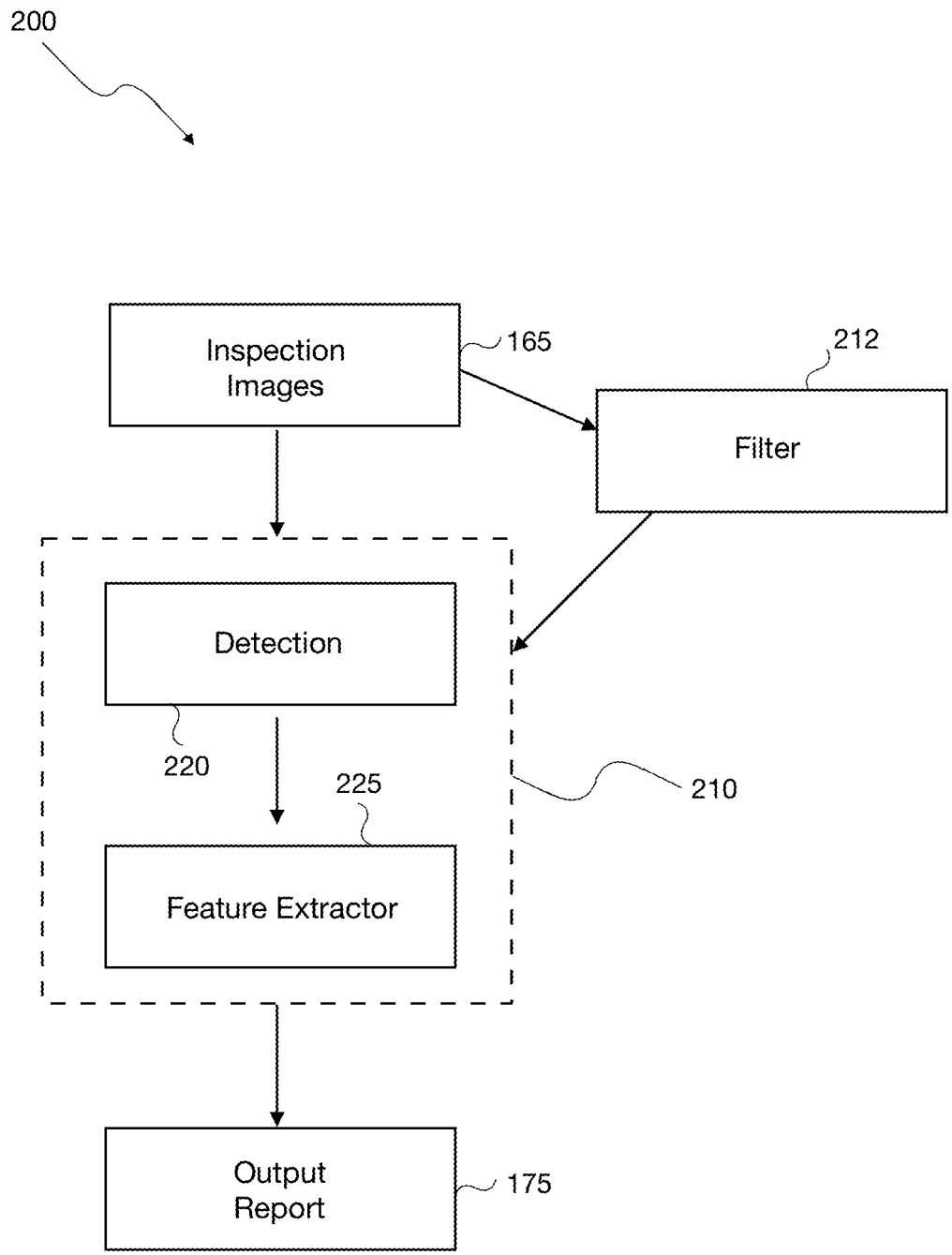
FIG. 2 is a flowchart illustrating a method of the steps performed by an image recognizer in performing automated infrastructure inspection according to one embodiment of the present disclosure.

FIG. 2 shows a method 200 performed by the image recognizer 110 for carrying out automated infrastructure inspection according to one embodiment of the present disclosure. Method 200 may be implemented using one or more of a server, processor, general-purpose computer, mainframe computer, quantum computer, or a combination thereof serving as the image recognizer 110. Method 200 begins by receiving one or more inspection images 165 as inputs. The method 200 may comprise filtering the inspection images 165 at block 212 to remove images of inadequate quality (e.g. poor resolution) from the inspection images 165. The remaining inspection images 165 are then analysed at block 210 to detect specific features and defects, if any, in the infrastructure elements captured in the inspection images. The completion of the analysis at block 210 results in the generation of an output report 175 as the output of method 200.

Output report 175 which may include the identity of the infrastructure feature(s), classification of any defect(s) therein, a remediation recommendation for the defect(s), and the physical location of the infrastructure feature(s). The output report may indicate the risk level of the identified defect (e.g. low, medium, or high) and a suggested remedy for the defect. The risk level may inform the recommendation provided in the output report. For example, a defect that is rated as high risk may result in a recommendation that certain remedial action be taken immediately, while a defect that is rated as low risk may result in a recommendation that allows for it to be looked at over a longer time frame. As an example, where the image analyzer 130 determines that the infrastructure feature is a healthy cross-arm, the associated recommendation may be to provide consistent inspection or maintenance at regular intervals. A healthy cross-arm is classified as low risk, so no immediate action is required. On the other hand, where the image analyzer 130 determines that the infrastructure feature is a broken cross-arm, the associated recommendation may be to take immediate remedial action (replacing the cross-arm) since the defect is considered high risk. In addition, the output report in this case may include listing standard operating procedures for cross-arm replacement.

Sample inspection images, in the form of photographs 81, 82 are provided in FIGS. 8A and 9A, along with their corresponding output reports 83, 84, in FIGS. 8B and 9B, respectively. The output report may be provided to a user in various formats, including for example a text and/or image file that can be viewed on a display on a device. For example, the output report may be provided as a PDF file, an Excel file, or a Word file, or provided through the user interface of an interactive application for a mobile device (e.g. an Android or iOS device) or an interactive website, or provided as a combination thereof.

The analysis at block 210 comprises the steps of detection 220 and feature extraction 225. Detection 220 is used to detect a region of interest (ROI) in the image. Feature extraction 225 is used to identify and categorize the feature(s) in the ROI. Detection 220 may incorporate non-maximum suppression techniques, for example, to ensure that a particular object or feature is identified only once. Detection 220 results in a single bounding box around the ROI. In alternate embodiments, other methods for detection of a ROI in an image can be used. Feature extraction 225 may be implemented using a suitable neural network model. Such a neural network model may comprise, for example, a convolutional neural network. The neural network model may be implemented using a suitable machine learning framework or library, including, for example, TensorFlow, Keras, Scikit-Learn, etc.

Figure 3:
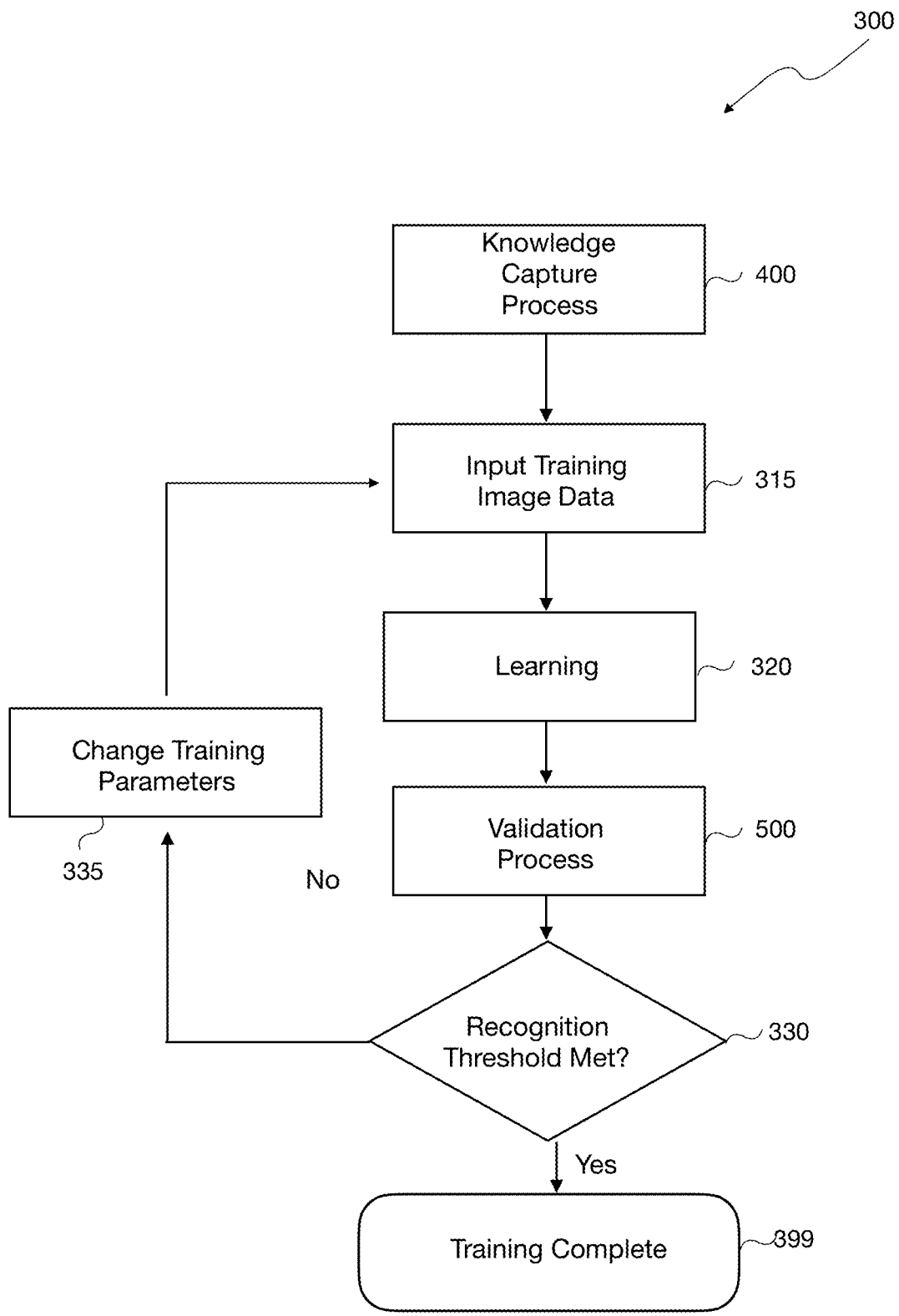
FIG. 3 is a flowchart illustrating an Artificial Intelligence (AI)-based training and validation process for automated infrastructure inspection according to one embodiment of the present disclosure.

Image recognizer 110 needs to undergo artificial intelligence-based training to enable it to perform feature extraction 225 of method 200. Image recognizer 110 needs to be trained to analyze inspection images 165 and identify any potential defects in the features shown therein. As noted above, image recognizer 110 may be implemented using a convolutional neural network model in some embodiments. Such a model can be provided training data to train it to extract or recognize features in the images. FIG. 3 shows an exemplary AI-based training and validation method 300 for training an image recognizer 110 to perform automated infrastructure inspection and validating its process. Method 300 begins at block 310 with capturing the knowledge of industry inspectors and experts, to produce a set of training and/or validation image data. An exemplary knowledge capture process that can be used at block 310 is described in more detail below with reference to FIG. 4. At block 315, the image data in the training image database 135 is provided as input to the image recognizer 110. In some embodiments, the training image data includes images and corresponding information including identification of infrastructure elements, identification of defects and/or damage of the infrastructure elements, nomenclature of the identified infrastructure and defects and/or damage, risk levels of the defects and/or damage, and remediation recommendations for the defects and/or damage. In one embodiment, the training image data may comprise for example, about 10,000 to about 10,000,000 training images. In general, the more training images, the more effective the training process. Using the training image data and the knowledge captured from industry inspectors and experts, the image recognizer 110 learns how to identify the features and defects shown in the training image data and to assess their risk and other characteristics (step 320). After the image recognizer 110 has processed the training image data, the image data in the validation image database 145 is provided as input to the image recognizer 110 to carry out a validation process at step 325. An exemplary validation process that can be used at step 325 is described in detail below with reference to FIG. 5.

If a predetermined threshold confidence level for features and defects recognition by the image recognizer 110 is reached (step 330), the AI-based training and validation process is complete (step 399). If the threshold confidence level is not reached (step 330), then the process returns to AI-based training step 315 for further training. Prior to repeating the AI-based training step, the process may modify the training parameters at step 335 by one or more of: inputting new training image data (which may be some of the validation image data); increasing the number of training images (for example, by including some validation images as training images); increasing the amount of training image data (for example, by including some validation image data as training image data); increasing the number of training steps; changing the batch size in the image recognizer 110; and decreasing the amount of data the image recognizer 100 processes in each training step. Other parameters may be modified in certain embodiments. The threshold confidence level may be 90%, according to a particular embodiment.

Figure 4:
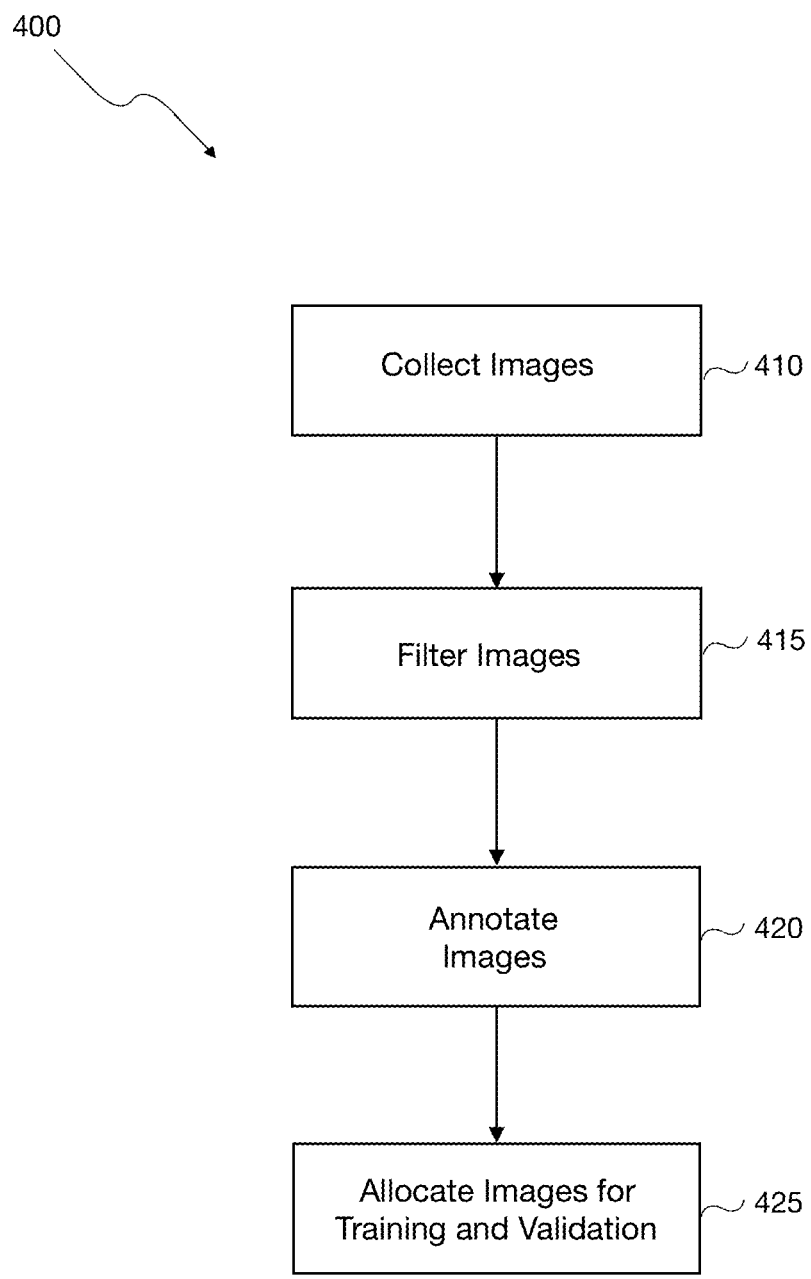
FIG. 4 is a flowchart illustrating a knowledge capture process used for the AI-based training and validation process according to one embodiment of the present disclosure.

FIG. 4 shows an exemplary method 400 for capturing the knowledge of industry inspectors to produce a set of training and/or validation image data that can then be used in the AI-based training and validation method 300 of FIG. 3. One or more inspectors review each image of the image data 155 to identify an infrastructure feature(s) and any defect(s) therein and provide a remediation recommendation with respect to the defect(s). In the illustrated embodiment of FIG. 4, process 400 begins at step 410 by collecting images of various infrastructure structures and elements that are customarily inspected. For example, at least 1000 images of each infrastructure feature and defect are collected in certain embodiments. The collected images may be filtered at step 415 to remove poor quality images and to only maintain the good quality ones. A "good quality" image may be one that meets one or more of the following requirements, for example: high definition (e.g. 1280×720p); is a close-up image of the feature and/or defect; the feature and/or defect is clearly visible without any obstructions; and the image was taken with good lighting. The filtering step 415 may be performed using one or more of manual and software-based methods.

After filtering, each of the remaining images is annotated by one or more industry inspectors at step 420. A suitable industry inspector for this process, for example, may be someone who has multi-decade experience in the field of infrastructure inspection and has extensive knowledge in inspection and image analysis methods for identifying defects. Each annotation generally includes identification and classification of the feature(s) and defect(s) shown in the respective image and a remediation recommendation for the defect(s). The annotation process may be performed by the inspectors using an image labelling program that allows the inspectors, for each image, to select the feature and/or defect of interest, provide suitable nomenclature for same, and associate a classification and a risk level to the defect. In some embodiments, defects may be classified by type (e.g. discoloration, fatigue, environmental, etc.) and by severity (e.g. low risk, medium risk, and high risk). For example, flashover damage may be classified as low risk. For each defect, a remediation recommendation is written up by the inspectors and may include information such as potential causes of the defect, the severity of the defect, and/or recommendations on how to address the defect. In one particular embodiment, the annotation data provided by the inspectors for each image is saved as an .xml file, which is separate from the image file, and is linked to the corresponding image file by a text string (e.g. <folder>testimages</folder><filename>TRAINING_IMAGE.jpg</filename><path>C:\Users Documents\RecognAlse\TRAINING_IMAGE.jpg</path>) While the annotation data is stored in a separate file from its corresponding image file, the annotation data may be saved in the same location as the image file. In one particular embodiment, the remediation recommendation may be provided in the form of a text file and is linked to a specific defect. The image and its corresponding annotation are input into the system 100 as image data 155.

After the images are annotated, the resulting image data is divided into two groups at step 425: training image data and validation image data, which may be stored in the training image database 135 and the validation image database 145, respectively, as described above with reference to FIG. 1. In some embodiments, each image data record is randomly designated as either training image data or validation image data. In a certain embodiment, 70% of the image data is training image data while the remaining (30%) is validation image data. The ratio of training image data to validation image data may vary in different embodiments or circumstances. For example, the ratio may be increased to improve the confidence level of process 300 if necessary, as described above.

In one embodiment, if a similar defect is classified by inspectors at different risk levels, the image recognizer 110 may be trained to give more weight to the higher risk level so that the system errs on the side of assigning a greater risk level (erring on the side of caution). Therefore, where there are risk level discrepancies for the same defect, the image recognizer 110 can be configured to, by default, select the higher risk level. Given that undetected defects can lead to serious consequences, it is preferable to err toward false positives and to minimize the occurrences of false negatives.

Figure 5:
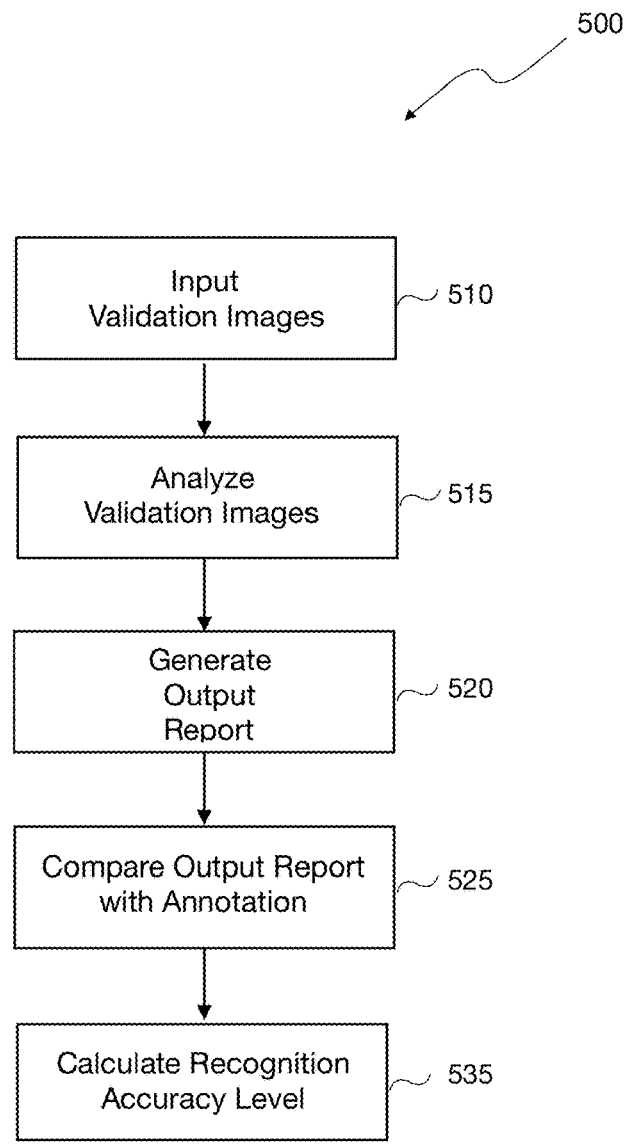
FIG. 5 is a flowchart illustrating a validation process used to refine the AI-based training process according to one embodiment of the present disclosure.

FIG. 5 shows an exemplary validation method 500 to determine the level of accuracy of the trained image recognizer 110. Method 500 may be performed by a validation component that is provided as part of system 100. The method 500 begins at step 510 by inputting some or all of the images of the validation image data into the image recognizer 110. The image recognizer 110 analyzes the validation images at step 515 by detecting and classifying the features and defects in the validating images, and based on this analysis it generates an output report at step 520. The output report is then compared at step 525 with the inspector's annotation that was generated for the same features and defects during the knowledge capture process (method 400 of FIG. 4). Based on these comparisons, at step 535 of method 500, a recognition accuracy level is calculated to determine the rate at which the image recognizer 110 can accurately identify and classify a defect and output the appropriate remediation recommendation. The confidence level in the image analyzer 130 is calculated based on the recognition accuracy and is then compared with the threshold confidence level (step 330 of method 300 in FIG. 3) to determine whether the AI-based training and validation process is complete. In particular embodiments, the accuracy level of the image analyzer 130 is calculated as [number of defects recognized]−[false positives]−[false negatives]. The confidence level in the image analyzer 130 is calculated as [AI accuracy]/[number of defects recognized by experts]× 100.

To improve the accuracy of the image recognizer 110, the training data is pre-processed before it is used to train the image recognizer 110. One or more of the following methods may be used to pre-process the training data:

Randomly flipping the image horizontally (which decreases or removes bias towards a "direction" of components);

Randomly changing the value of pixel scale (which decreases or prevents overfitting to a particular image size);

Randomly rotating images by 90° (which decreases or removes directional bias);

Randomly changing Red-Green-Blue (RGB) values to grey (which decreases or removes color bias especially regarding backgrounds such as green pastures, blue water, red dirt);

Randomly adjusting the brightness of images (which decreases or prevents system bias regarding lightning conditions at the time of image capture);

Randomly adjusting contrast of images (which decreases or prevents system bias regarding lightning conditions);

Randomly adjusting hue of images (which decreases or prevents system bias regarding lightning conditions and camera specific settings);

Randomly adjusting saturation of images (which decreases or prevents system bias regarding lightning conditions and camera specific settings);

Randomly distorting colors of images (which decreases system reliance on color and increases system robustness).

Figure 6:
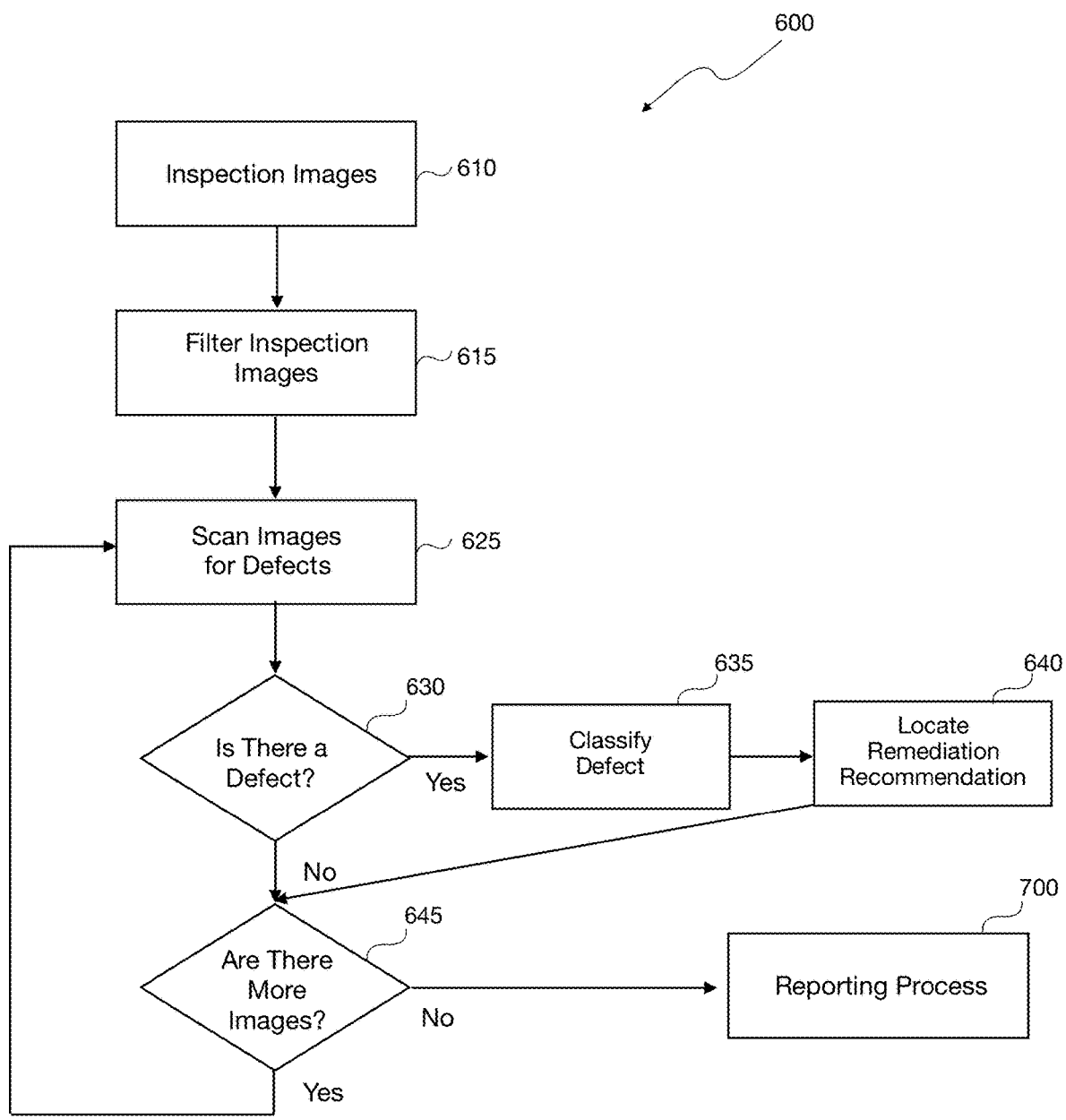
FIG. 6 is a flowchart illustrating an analysis process according to one embodiment of the present disclosure.

Once the AI-based training and validation process is complete, the image recognizer 110 is ready to analyze inspection images that have not been previously seen by the system 100. FIG. 6 shows an exemplary analysis method 600. The method 600 begins at step 610 by providing inspection images 165 as input to the image recognizer 110. At step 615, the image recognizer 110 may filter the inspection images to remove low quality images and only proceed with good quality inspection images for the remaining steps of the process. The filtering step 615 may be similar to the above-described step 415 in method 400 of FIG. 4, or step 212 of method 200 of FIG. 2. Each of the filtering steps 212, 415 and 615 may be performed by a filtering component, which may be implemented using software. At step 625, the image recognizer 110 then scans the remaining good quality inspection images to detect any defects. If the image recognizer identifies a defect within the inspection images at block 630, the method 600 proceeds to step 635 wherein the image recognizer classifies the defect, for example by type and severity, and then generates or locates a remediation recommendation that is associated with the identified defect at step 640. In a particular embodiment, a table of defects and associated recommendations is generated through the knowledge capture process, and the image recognizer looks up in the table the recommendation associated with a particular defect. The image recognizer 110 then checks if there are more inspection images to analyze at block 645. If there are more inspection images, the image recognizer returns to step 625 to scan the new inspection images for defects.

At step 630, if the image recognizer 110 does not find any defects in scanned inspection images, the image recognizer then checks if there are more inspection images to be analyzed at block 645. If there are more inspection images, the image recognizer returns to step 625 to scan the new inspection images for defects.

At block 645, if there are no more inspection images to be analyzed, the image recognizer completes the analysis process 600 at step 655 by generating an output report based on the defect(s) identified and the located remediation recommendation(s) associated with the defect(s) in accordance with a reporting process. An exemplary reporting process is described below in detail with reference to FIG. 7.

Figure 7:
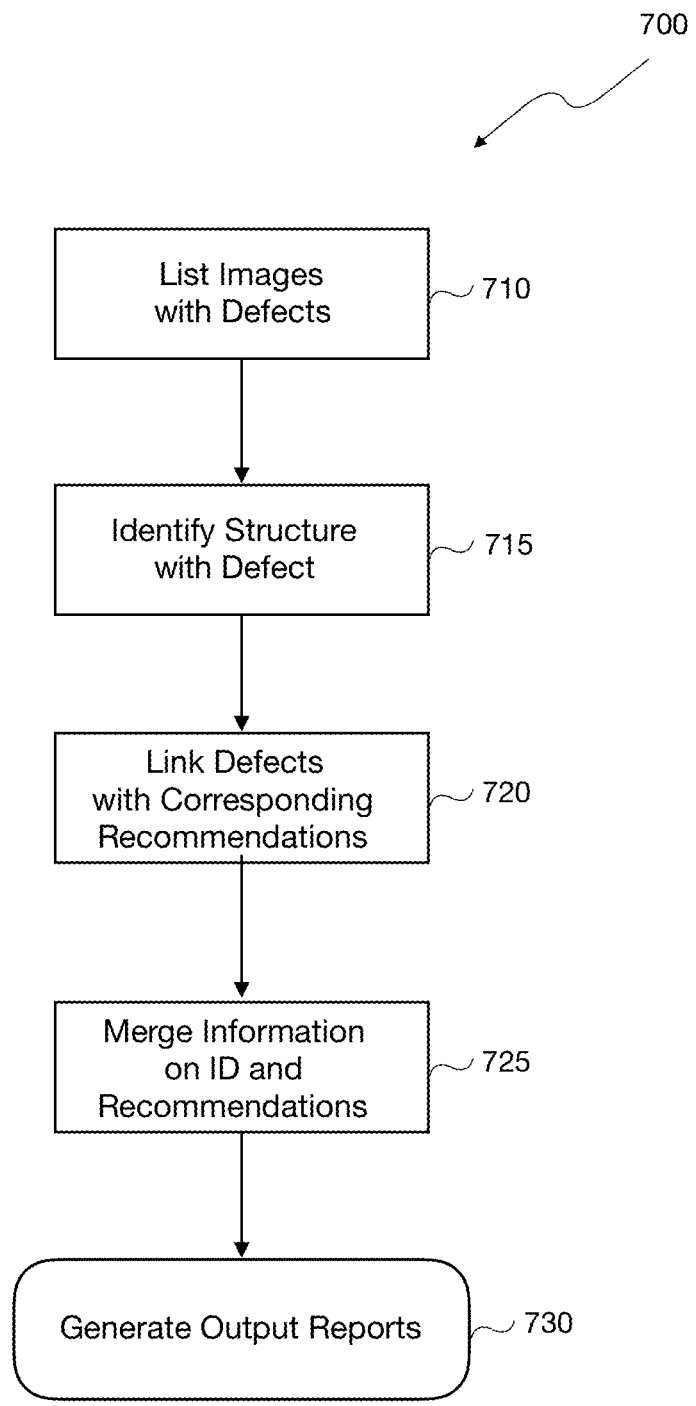
FIG. 7 is a flowchart illustrating an inspection reporting process according to one embodiment of the present disclosure.

FIG. 7 shows an exemplary reporting method 700. At the start of the reporting method 700, the image recognizer 110 generates a list of inspection images with defects at step 710, after scanning the inspection images at step 625 of process 600 as described above. The image recognizer 110 then identifies the structure and/or the feature of the structure that has one of the identified defects at step 715. At step 720, the image recognizer 110 links each of the identified defects with its corresponding remediation recommendation. The image recognizer then merges the defect identification information with the corresponding remediation recommendation at step 725, to generate one or more output reports at step 730.

FIGS. 8 to 12 illustrate exemplary inspection images and/or results that may be generated through operation of the system described herein executing one or more of the aforementioned methods. These results may include inspection reports and visual indicators of issues identified with respect to particular infrastructure assets. FIGS. 8A, 8B and 9A, 9B show sample inspection images and corresponding output reports in exemplary scenarios. FIG. 8A shows an image of a part of a high voltage transmission line with a cross arm insulator. The system has identified a deficiency in the cross arm insulator within the region outlined in box 80 (i.e. a piece of the insulator is missing). FIG. 9A shows an image of a part of a high voltage transmission line with a glass insulator. The system has identified a deficiency in the glass insulator in the region outlined in box 90 (i.e. one of the glass insulator shells has broken off). The corresponding report depicted in each of FIGS. 9A and 9B identifies the infrastructure and some of its characteristics (e.g. live voltage level=230 kV), the location of the deficiency (e.g. as specified by GSP coordinates), and provides a description of the deficiency, along with a recommended action. The report also indicates a risk level of the deficiency and criticality of the remedial action, to assist the operator with determining whether they need to act immediately, in the near future, or schedule the remedial action for the next regular maintenance.

Figure 10:
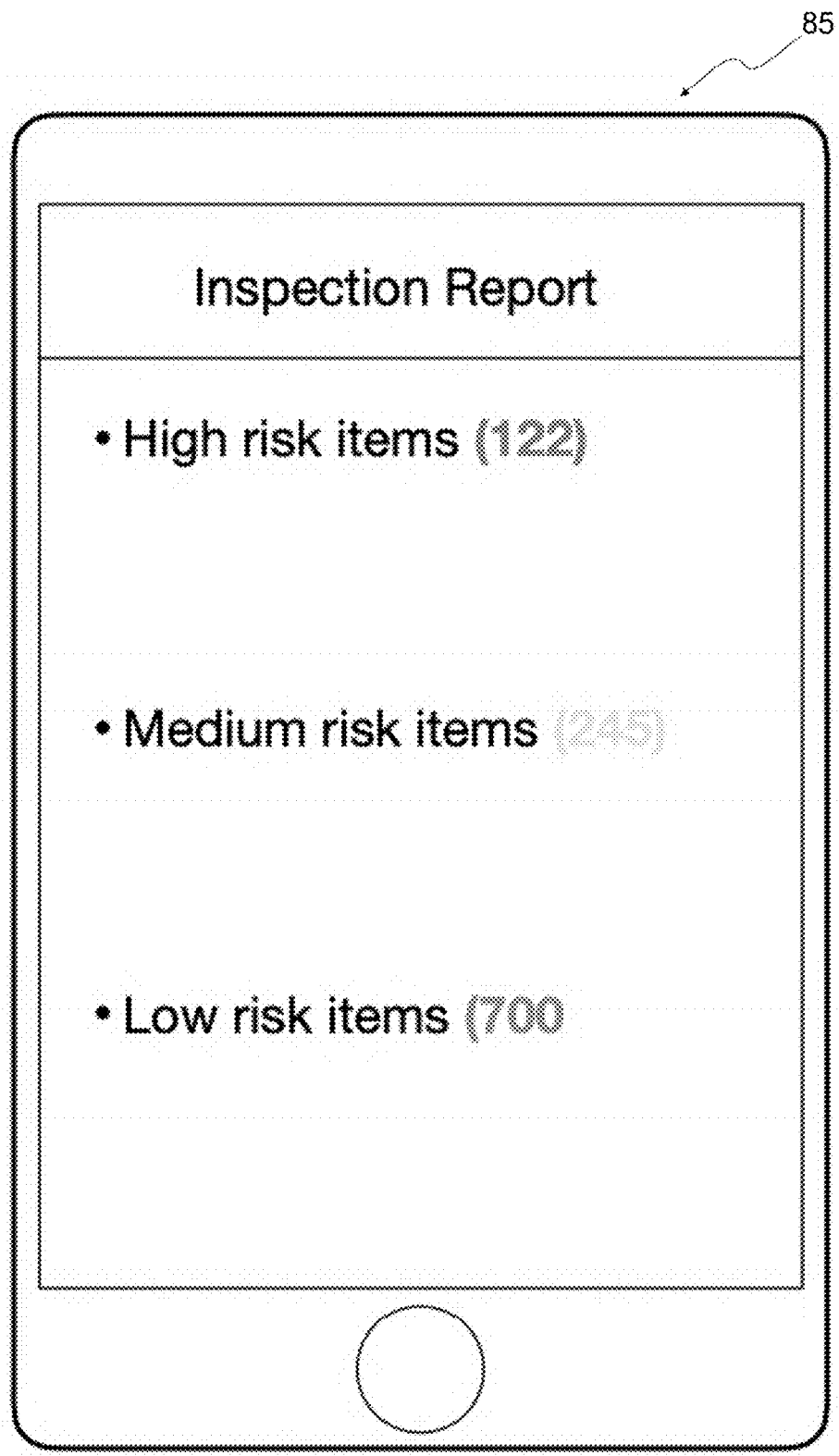
FIG. 10 is a screen shot of a summary of an inspection report according to one exemplary scenario.
Figure 11:
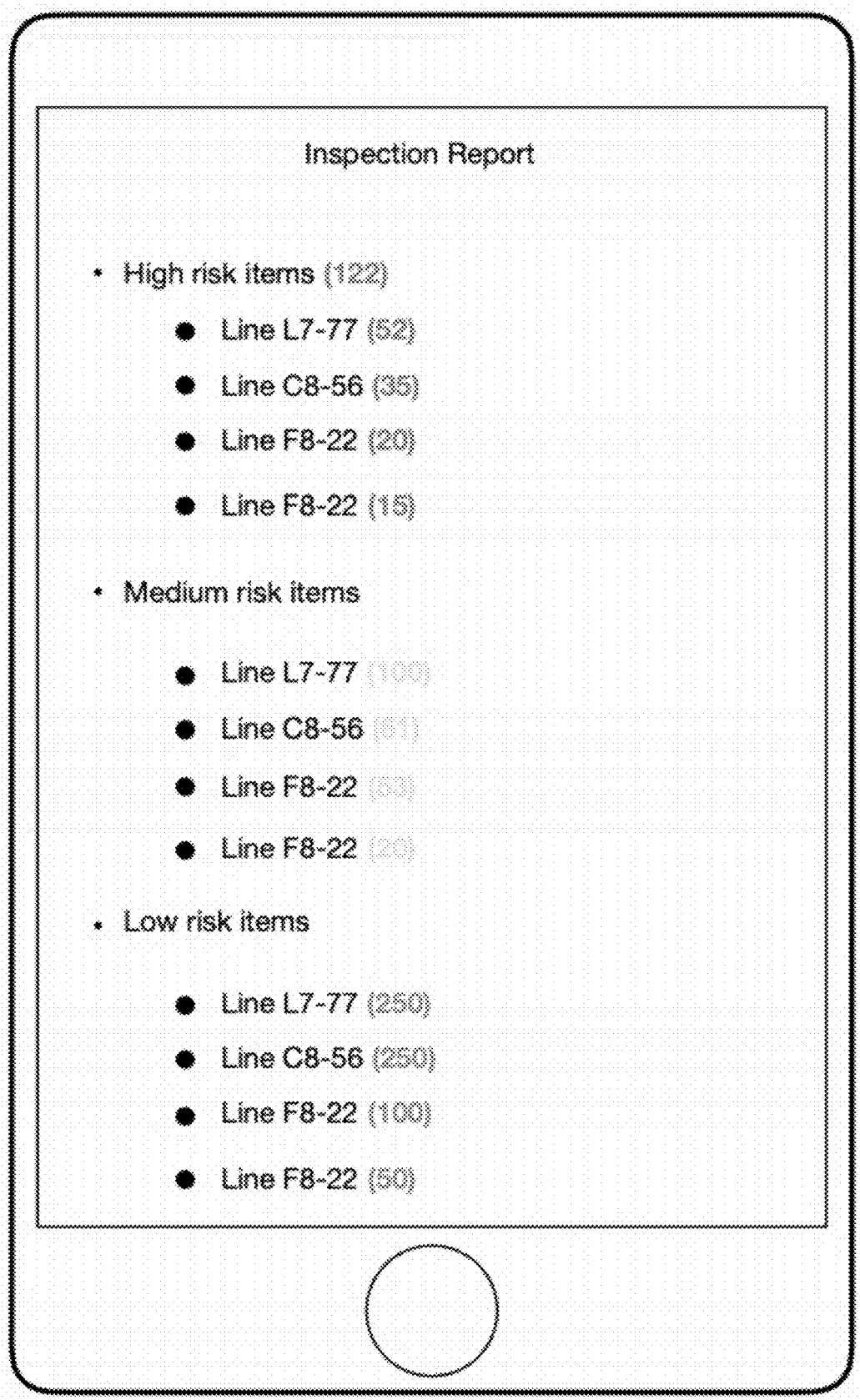
FIG. 11 is a screen shot of a more detailed view of the inspection report for the exemplary scenario illustrated in FIG. 10.

In particular embodiments, inspection reports may be generated and displayed on a graphical user interface provided through a mobile application on the operator's device. FIGS. 10, 11 and 12 show exemplary screen shots of inspection reports delivered through such a mobile application. FIG. 10 shows an inspection report overview 85 with a list of the number of high-risk items, medium-risk items and low-risk items that were identified. FIG. 11 shows a breakdown 86 of the particular infrastructure lines where the high-risk, medium-risk and low-risk items were identified. FIG. 12 shows a detailed inspection report 87 for an issue that was identified for a distribution pole. The detailed inspection report includes an image of the infrastructure feature (where a box is drawn around the issue), an indication of the level of risk (medium risk), description of the issue (excessive accumulation of snow/ice around the infrastructure), remedial action (run the line hotter to melt the excess away if the forecast is for increased precipitation rather than rising temperatures), and a map indicating a location of the infrastructure part which has the issue.

The present disclosure thus provides an efficient system and method of identifying defects in infrastructure that minimizes human involvement and the subjectivity associated with such human involvement. The consistency and objectivity of the infrastructure inspection process are therefore improved. Particular embodiments of the system and method described herein not only identify potential defects but evaluate the risk and/or severity and provide recommendations for managing the risks associated with the defects.

The invention claimed is:

1. A method of automatically inspecting infrastructure comprising:
   receiving image data comprising images of infrastructure defects, annotated with classification data;
   allocating a first portion of the image data as training image data;
   allocating a second portion of the image data as validation image data;
   training an artificial intelligence-based image recognizer using the training image data;
   validating the image recognizer using the validation image data, wherein validating comprises;
      calculating a recognition accuracy level of the image recognizer; and
      comparing the recognition accuracy level with a threshold confidence level;
   initially allocating approximately 70% of the image data as the training image data and allocating approximately 30% of the image data as the validation image data; and
   if the recognition accuracy level is below a threshold confidence level, adjusting the allocation of training image data and validation image data to improve the recognition accuracy level.

2. The method of claim 1 comprising:
   inputting an inspection image into the image recognizer;
   analyzing, by the image recognizer, the inspection image;
   identifying, by the image recognizer, a defect in the inspection image;
   locating in a database, by the image recognizer, a remediation recommendation associated with the defect; and
   generating an output report based on the defect and the remediation recommendation.

3. The method of claim 2 wherein the output report comprises identification and classification of the defect and one or more of: a potential cause of the defect; severity of the defect; and a recommendation on how to address the defect.

4. The method of claim 1 wherein the classification data comprises defect type and/or severity.

5. The method of claim 4 wherein the defect type is one or more of: discoloration, fatigue and environmental.

6. The method of claim 1 comprising providing a plurality of images of infrastructure, and filtering the plurality of images to generate a set of inspection images for input to the image recognizer.

7. The method of claim 6 wherein filtering the plurality of images comprises one or more of: selecting images of high definition, selecting images that show a close-up image of the feature and/or defect, selecting images in which the feature is clearly visible without obstructions; and selecting images captured with good lighting conditions.

8. A system for automatically inspecting infrastructure, comprising:
   a database management component configured to collect image data comprising images of infrastructure defects annotated with classification data, allocate a first portion of the image data as training image data, and allocate a second portion of the image data as validation image data;
   an artificial intelligence-based image recognizer configured to receive the image data from the database management component and apply deep learning techniques to develop processes to identify and classify infrastructure defects, wherein the image recognizer is configured to receive an inspection image, analyze the image, identify a defect in the inspection image, locate in a database a remediation recommendation associated with the defect, and generate an output report based on the defect and the remediation recommendation;
   a validation component configured to receive the output reports generated by the image recognizer using validation data, and compare them to the output reports generated by the image recognizer using the training data, calculate a recognition accuracy level of the image recognizer, and compare the recognition accuracy level with a threshold confidence level;
   wherein the database management component is configured to initially allocate approximately 70% of the image data as the training image data and allocate approximately 30% of the image data as the validation image data; and
   wherein the validation component causes the database management component to adjust the allocation of training image data and validation image data to improve the recognition accuracy level if the recognition accuracy level is determined to be below a threshold confidence level.

9. The system of claim 8 wherein the output report comprises identification and classification of the defect and one or more of: a potential cause of the defect; severity of the defect; and a recommendation on how to address the defect.

10. The system of claim 8 wherein the classification data comprises defect type and/or severity.

11. The system of claim 10 wherein the defect type is one or more of: discoloration, fatigue and environmental.

12. The system of claim 8 comprising an image filtering component configured to receive a plurality of images of infrastructure, and filter the plurality of images to generate a set of inspection images for input to the image recognizer.

13. The system of claim 12 wherein the image filtering component is configured to perform one or more of: selecting images of high definition, selecting images that show a close-up image of the feature and/or defect, selecting images in which the feature is clearly visible without obstructions; and selecting images captured with good lighting conditions.

* * * * *